METHOD OF MAGNETICALLY RECORDING AND MECHANISM THEREFOR

Filed March 23, 1950 2 Sheets-Sheet 1

Inventor
Hugh A. Howell
by The Firm of Charles W. Hills Attys.

FIG. 4
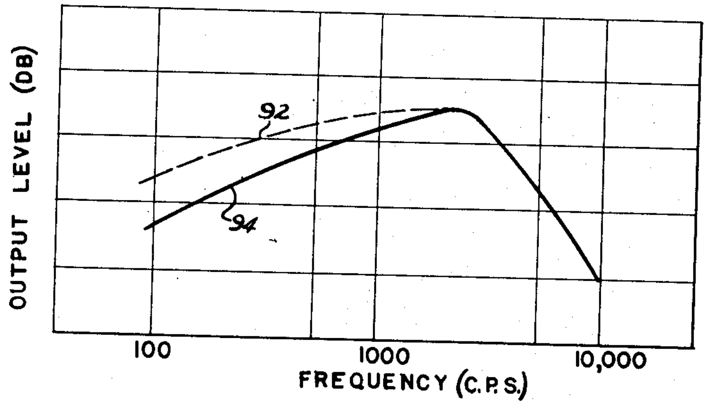
FIG. 6
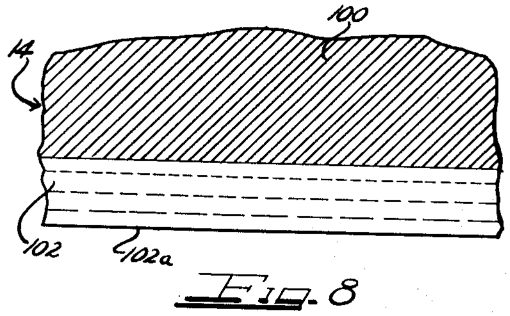
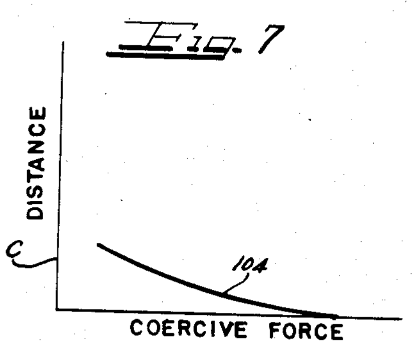
FIG. 8
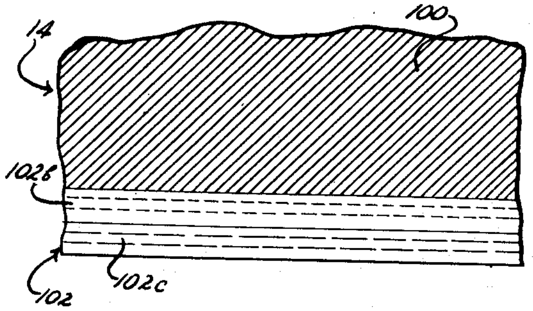
FIG. 9
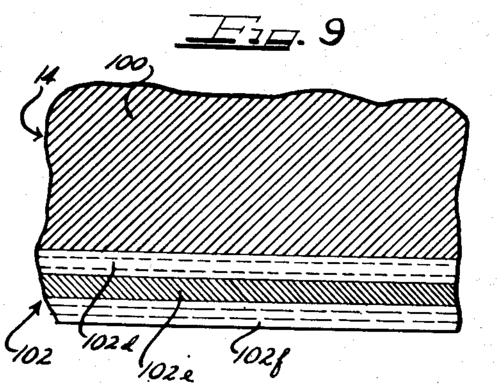
Inventor
HUGH A. HOWELL
by The Firm of Charles W. Hills Attys.

Patented Aug. 4, 1953

2,647,954

UNITED STATES PATENT OFFICE 2,647,954

METHOD OF MAGNETICALLY RECORDING AND MECHANISM THEREFOR

Hugh A. Howell, Berwyn, Ill., assignor to The Indiana Steel Products Company, Valparaiso, Ind., a corporation of Indiana Application March 23, 1950, Serial No. 151,514

4 Claims. (Cl. 179—100.2)

My invention relates to magnetic recording and more specifically to an improved method of and means for magnetic recording an intelligence having frequency components covering a wide range.

In one method of recording and reproducing an intelligence, commonly termed "magnetic recording," a lengthy magnetizable record medium is drawn across a recording and reproducing head at predetermined linear velocity. The head includes a magnet core portion having a pair of confronting pole pieces across which the medium rides and a coil encircling the core portion. During recording, a time-varying current is caused to flow through the coil to cause a time-varying flux in the magnetic core and a time-varying magnetomotive force to appear across the gap defined by the confronting pole pieces. The magnetizable record medium partakes of this flux as it is drawn across the confronting pole pieces and is thereby magnetized along its length in accord with the time variations of the intelligence. During the reproducing operation, the recorded medium is caused to travel across the confronting pole portions of the head in the same manner as during recording and thereby causes a magnetic flux within the magnet core in accord with the magnetization of the incremental portion of the medium directly over the air gap. This flux threads the coil encircling the core and by its time variations induces a voltage in the core which may be amplified to reproduce the recorded intelligence.

In order that the reproduced intelligence obtainable from a magnetic recorder shall correspond to a maximum degree with the recorded intelligence, it is desirable that the intensity of the voltage induced in the coil of the head during reproduction vary uniformly with the frequency of the intelligence being recorded. Deviations from this response cause distortions which result in voltage output unlike that corresponding to the intelligence.

It is well known that the ability of a lengthy magnetizable record medium to sustain the intelligence recorded thereon is determined by the maximum permissible flux density in that medium, and that if this flux density is exceeded, distortions occur. Inasmuch as the peak value of this flux density is determined by the peak magnetomotive force exerted across the air gap of the core, the peak current flow in the coil during the recording operation is thereby limited. Thus, to achieve maximum utilization of the recording medium, it is highly desirable to have a uniform peak value of current flow in the recording coil independent of the frequency of the intelligence being recorded. However, it has been found that even though a uniform constant peak current value flows through the head, there is a tendency of the recorder to overload the lengthy magnetizable medium at the low frequencies with the consequence that distortions take place.

In accordance with the present invention, the foregoing tendency to overload the medium at low frequencies is overcome by grading the coercive force of the magnetizable record medium from its edge in accord with the space distribution of flux about the air gap of the head.

It is accordingly a general object of the present invention to provide methods of and means for magnetic recording with improved frequency response.

Further, it is an object of the present invention to provide an improved method of and means for magnetic recording wherein no tendency to overload at low frequencies occurs.

Further, it is an object of the present invention to provide an improved lengthy magnetizable medium for use in magnetic recorders.

It is still another object of the present invention to provide an improved method of and means for magnetic recording which operates to achieve a uniform variation in recording level with frequency.

The novel features which I believe to be characteristic of my invention are set forth with particularity in the appended claims. My invention itself, however, both as to its organization and method of operation, together with further objects and advantages thereof, can best be understood by reference to the following description taken in connection with the accompanying drawings in which:

Figure 4 is a diagram showing how a lengthy magnetizable record medium tends to be overloaded at low frequencies;

Figure 6 is a greatly enlarged diagrammatic view of a lengthy magnetizable record medium constructed in accordance with the principles of the present invention;

Figure 7 is a chart showing the variations of coercive force of the magnetizable material used in the form of the present invention shown in Figure 6;

Figure 8 is a greatly enlarged diagrammatic view of an alternative embodiment of the present invention; and Figure 9 is a greatly enlarged diagrammatic view illustrating still another embodiment of the present invention.

Figure 1:
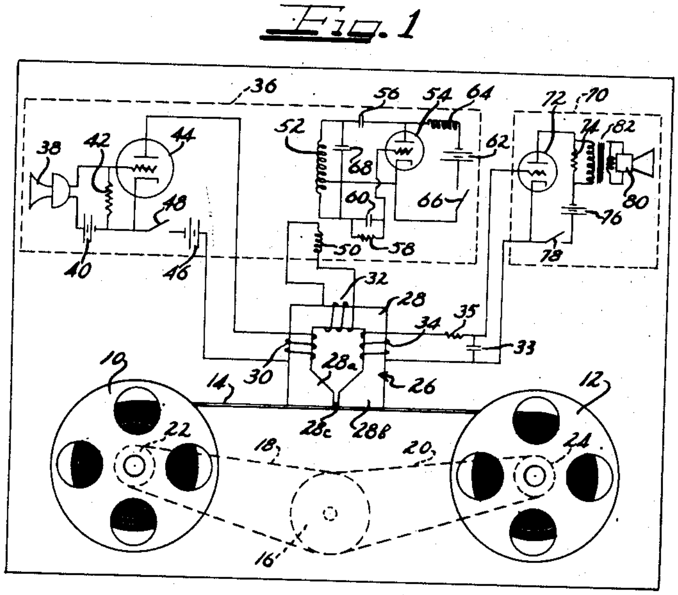
Figure 1 is a diagrammatic top plan view showing a magnetic recorder and the circuits of the type that may be employed therein.

Referring now to the view of Figure 1, there is shown a pair of reels 10 and 12 upon which the lengthy magnetizable record medium 14 is wound to travel therebetween as these reels are rotated. These reels are rotated by a driven pulley 16 which receives belts 18 and 20 which ride on pulleys 22 and 24 to drive the reels 10 and 12, respectively. The relative diameters of the pulleys 16, 22 and 24 are chosen to cause the reel 12 to tend to wind the medium 14 at a faster rate than the medium 14 is released by the reel 10. One of the belts 18 or 20 is designed to slip to maintain the medium taut in the region between the reels 10 and 12. Suitable means (not shown) are provided to rotate the pulley 16 at predetermined velocity to cause the medium 14 to travel from reel 10 to reel 12.

An electromagnetic transducer head 26 is disposed between the reels 10 and 12 to receive the medium 14 as it travels therebetween. This head includes a U-shaped magnet core 28 of iron or similar magnetizable material having confronting pole portions 28*a* and 28*b* which define an air gap 28*c*. The medium 14 is drawn across the pole portions 28*a* and 28*b* and thus travels across the edge of the air gap 28*c* and is exposed to the fringing magnetic field about that gap. A pair of coils 30 and 32 are wound about the core 28 to cause magnetic flux within the core 28 in accord with the current flow in the coils. In addition, a pickup coil 34 is wound about the core 28 to partake of the flux in that core and thus to create an induced voltage determined by the time rate of change of that flux.

The windings 30 and 32 are connected to a magnetic recording unit to cause a time varying magnetomotive force across the gap 28*c* in accord with the time variations of the intelligence to be recorded. This unit is shown diagrammatically at 36. It may, for example, include a microphone 38 exposed to sound waves to be recorded. The variations in the intensity of the sound waves cause time variations in the resistance of the microphone and thus cause a varying voltage from the source 40 to appear across the resistance 42, thereby varying the cathode-control electrode space path voltage of the electron discharge device 44 in accord with the time variations of the sound wave.

Cathode-anode space path voltage is applied to the device 44 through the circuit which can be traced through coil 30, source 46 and switch 48. Since the cathode-anode space path current of the device 44 varies in accord with the cathode-control electrode potential thereof, the current flow in the coil 30 likewise varies in accord with the intelligence of the sound waves to which the microphone 38 is exposed. This causes a time varying magnetomotive force across the air gap 28*c* of the head 28, the intensity of the field varying in accord with the intelligence.

It is the function of the coil 32 to impress a high frequency bias magnetomotive force across the gap 28*c*. To this end, the coil 32 is connected in circuit relationship with the transformer coil 50 which is in inductive relationship with the coil 52. The coil 52 is provided with a tap and is connected to the electron discharge device 54 to form a Hartley oscillator circuit. To this end, one end of coil 52 is connected to the anode of electron discharge device 54 through the coupling capacitor 56 and the opposite end of coil 52 is connected to the control electrode of electron discharge device 54 through the grid leak 58 and capacitor 60. Moreover, the cathode of electron discharge device 54 is connected to the tap on coil 52. Cathode-anode space path voltage for the device 54 is derived from the source 62 through the path which may be traced through the choke coil 64, source 62 and switch 66.

The coil 52 is shunted by the capacitor 68 which forms a resonant circuit therewith, the circuit being tuned to a suitable biasing frequency as, for example, 40 kilocycles.

During recording, the switches 48 and 66 are closed and the intelligence or speech to be recorded is impressed upon the microphone 38. Simultaneously the medium 14 is drawn across the head 26 and successive incremental portions thereof partake of the fringing field about the air gap 28*c*. The medium is thereby magnetized along its length in accord with the time variations of the intelligence.

The simultaneous application of high frequency current in coil 32 renders the recording more effective by eliminating effects due to nonlinearities in the magnetic characteristic of medium 14.

The reproducer unit 70 may, for example, include an electron discharge device 72 having cathode-anode, and control electrodes, and having its cathode-anode control electrode space path connected across the pickup coil 34. The cathode-anode space path of this device is connected in series circuit with the resistance 74, the source 76, and the switch 78. As the cathode-control electrode voltage of the electron discharge device 72 varies in accord with the time variations of the voltage induced in the coil 34, the cathode-anode current flow of that device varies accordingly, thereby causing a time-varying voltage to be produced across the resistance 74. A dynamic loud speaker 80 is connected across the secondary winding of the coupling transformer 82, the primary winding of which is connected across the resistance 74 to reproduce the original intelligence.

Since the voltage induced in the pickup coil 34 during reproduction varies as the time rate of change of the flux in the core 28, as distinguished from the instantaneous value of this flux, the value of this voltage uniformly increases with increased frequency if the peak flux is maintained constant. The resulting distortion in the output signals is eliminated by providing a suitable equalizer or integrating network to produce a voltage determined by the value of the integral of the induced voltage and hence the actual value of the flux. One simple form of this network comprises the resistor 35 and the condenser 33, Figure 1, the condenser being charged through the resistor in accord with the integral of the voltage appearing across the coil 34 and applying a corresponding voltage to the cathode-control electrode space path of electron discharge device 72.

It will be understood that the foregoing circuit and mechanical arrangement is illustrative only, and that various modifications thereof may be used in a practical magnetic recording and reproducing mechanism. Moreover, the units may be combined, as may be the coils 30, 32 and 34, and suitable switching mechanism may be provided to achieve the various functions thereof.

Figure 2:
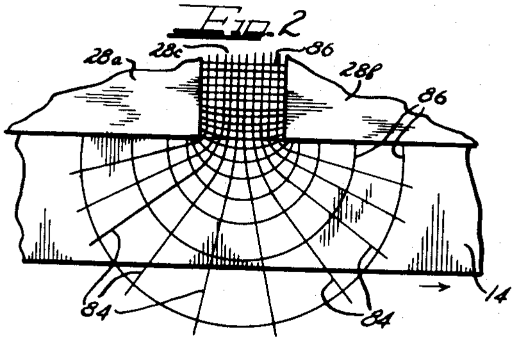
Figure 2 is a greatly enlarged view of the confronting pole portions of the head portion of the magnetic recorder and showing the distribution of the magnetic field across these portions.

Figure 2 is a greatly enlarged view showing the confronting pole portions 28a and 28b of the core 28 and the intermediate air gap 28c defined thereby, together with a fragmentary portion of the medium 14 immediately over these confronting pole portions. In addition, Figure 2 shows the magnetic field about these pole portions and the medium 14 when current flow in coils 30 and 32 takes place.

In the magnetic field plot of Figure 2, the lines 84 are lines of constant magnetic potential and the lines 86 show the path of the magnetic flux extending between the poles.

As will be evident to those skilled in the art, the intensity of the magnetic field about the confronting pole portions 28a and 28b is inversely proportional to the spacing between adjacent lines of magnetic potentials 84. Hence, in the region of the air gap 28c, where the lines 84 are closely and uniformly spaced, a high uniform magnetic field exists. However, at the regions remote from the corners of the confronting pole portions 28a and 28b, the lines 84 are spaced to a greater degree and hence there is a less intense magnetic field. Between the air gap 28c and the more remote portions, the intensity of the magnetic field is graded in accord with the distance from the pole portions 28a and 28b.

From the foregoing, it will be evident that as the magnetizable medium 14 travels across the confronting pole portions 28a and 28b, the various portions of that medium are subjected to a magnetic field of different intensity, depending on the distance from the edge portions thereof, the intensity decreasing as the distance from the edge adjacent the pole portions 28a and 28b is increased. Moreover, the intensity of the magnetic field for any one portion of the record medium 14 varies as it traverses the pole portions 28a and 28b, due to the fringing effect of the field between these portions. Consequently, any one portion of the medium 14 is first subjected to a field of extremely low intensity which progressively increases as a point opposite the center of the air gap 28c is approached and then progressively decreases as that point is passed.

Figure 3:
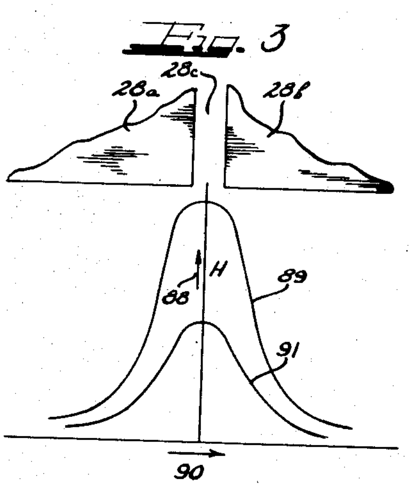
Figure 3 is a diagram showing the variations in magnetomotive force points on the record medium travel across the confronting pole portions of the head.

In Figure 3, there is shown in chart form the variation in the intensity of the magnetic field to which points on the medium 14 are exposed as they travel across confronting pole pieces 28a and 28b and the intermediate air gap 28c located therebetween. In this chart, increased values of magnetic field intensity are shown by increased displacement of points in the direction of the arrow 88 whereas the position of the points on the medium relative to the center of the air gap 28c are shown along the axis 90 which is aligned with and corresponds to the actual dimensions of the confronting pole pieces 28a and 28b and the intermediate air gap 28c as shown in the figure.

Curve 89, Figure 3, represents the magnetic field to which a point on the medium near the edge adjacent the head is exposed and curve 91 represents the corresponding field for a point on the medium more remote from that edge. The intensity of the fields to which these separate points are exposed is graded approximately as the square of the distance of each from the edge of the medium adjacent the head, the intensity decreasing as the distance from the edge increases.

The variations in the intensity of the magnetic field, to which the various portions of the medium 14 are exposed, cause corresponding variations in the degree of magnetization imparted to the medium and produce a tendency of the medium to be overloaded at low frequencies. Moreover, while the amount of high frequency bias magnetomotive force applied to some regions of the medium is proper other regions are exposed to improper bias. One result of this phenomenon is indicated in graphic form in Figure 4 in which curve 92 shows the actual variation in the voltage induced in pickup coil 34 at constant peak recording current flow in the coils 30 and 32 and with different frequencies. Curve 94 represents the theoretical response curve corresponding to a uniform peak value of flux in the medium and hence most effective utilization of the medium. Both of these curves drop off in the higher frequency range due to the combined effects of demagnetization and other phenomena.

It will be observed that the curve 92 shows a substantially greater output level in the frequency range from 100 to 1000 cycles than does the curve 94. Since the curve 94 corresponds to a constant peak value of magnetic flux in the medium 14, it is evident that recording and reproducing with operation on the curve 92 does not effectively utilize the recording medium, inasmuch as the low frequency portions are recorded at a substantially higher maximum flux density than are the high frequency portions thereof and if distortion is to be avoided it is necessary to operate at a relatively low flux density in the higher frequency range. Even if this is done difficulty may be encountered in applying correct high frequency bias flux to all portions of the medium.

In accordance with the present invention, the distortions in the low frequency range of curve 92, Figure 4, are overcome by grading the characteristics of the magnetic recording medium in accord with the distance from the edge portion thereof adjacent the transducer head. This can best be understood by reference to Figure 5 which is a diagram illustrating the effects of subjecting the magnetizable record medium to a magnetic field. In this chart, increased values of magnetic field intensity (H) are shown in the direction of the arrow 96, whereas increased values of magnetic flux (B) in the medium are shown in the direction of the arrow 98. When a point on the lengthy magnetizable record medium approaches the confronting pole portions 28a and 28b, it is in the substantially magnetic neutral condition indicated at point O, Figure 5. As the intensity of the magnetic field increases during the time that point is approaching alignment with the center of the air gap 28c, the intensity of the magnetic field progressively increases until it reaches a maximum indicated at C, Figure 5. At this time, the magnetic flux at that point in the medium is a maximum value. As the point in the medium leaves a position in alignment with the center of the air gap 28c, the intensity of the magnetic field H progressively decreases until it is again zero as that point leaves the pole piece 28b. The flux density (B) also progressively decreases, but not in proportion to the decrease in magnetic field intensity, with the consequence that when the field intensity is reduced to zero there is a predetermined residual flux density D remaining. It is this flux density that remains in the medium and accomplishes the subsequent reproduction.

Figure 5:
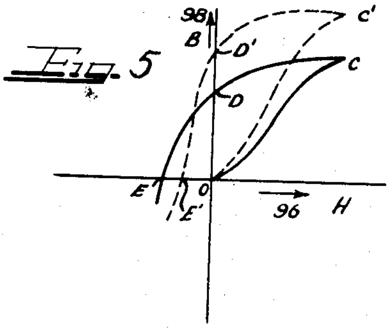
Figure 5 is a diagram showing the B-H characteristics of the magnetizable medium.

One of the characteristics of a magnetic medium which determines to a substantial degree the value of the peak flux that may be recorded without distortion, as well as the difficulty of imparting that peak flux to the medium, is the "coercive force." This quantity is a measure of the difficulty of demagnetizating the medium once it is magnetized and is indicated by the amount of reverse magnetic field necessary to neutralize the residual induction D, Figure 5. This quantity of magnetic field intensity is indicated at OE, Figure 5.

The dotted curve on Figure 5 shows the characteristics of another magnetizable material suitable for use in magnetic recorders. This material, when subject to the same maximum field intensity H as is the material of the solid lines of that figure, experiences an increased flux density, as indicated at point C'. Correspondingly, the residual induction is increased to the value D' and the coercive force is decreased to the value E'. In practical materials suitable for use in magnetizable record mediums, the values of the peak flux (or the average permeability of the medium), the value of the residual induction, and the value of coercive force are interrelated so that it can be said that, in general, materials of lower coercive force have higher residual induction and higher permeability.

In accordance with one form of the present invention, the magnetic characteristics of the magnetizable material on medium 14 are graded in accord with the distance thereof from the surface or face of that medium by choosing material having a coercive force of relatively high value at the edge of the medium adjacent the head and progressively lower values in the material more remote from that edge. Preferably, this grading of the coercive force of the material is in accord with the square of the distance from the face thereof, to correspond with the variation in the peak magnetic field as indicated in Figure 3. The characteristics of the magnetizable recording medium thereby compensate for the variations in the intensity of the magnetic field and all portions of the medium are utilized most effectively throughout the useful frequency range.

It will, of course, be apparent that the coercive force of the magnetizable material is only one magnetic characteristic that may be graded to compensate for the graded magnetic field adjacent the confronting pole pieces of the head. Residual flux, permeability, or other characteristics may be graded for this purpose. However, in practical magnetic materils, these various characteristics are interrelated so that variation of one to compensate for the field also results in variations of the others.

There is shown in Figure 6 a greatly enlarged fragmentary cross sectional view of a lengthy magnetizable record medium 14 of the type having a backing portion 100 of paper, plastic, or the like, and a coating 102 thereon, the coating 102 being of magnetizable material. As indicated by the dashed lines of progressively decreased length from the face 102a of the medium 14 to the edge of the backing 100, the coercive force of the material of the coating 102 is progressively decreased from the edge portion thereof to the point adjacent the backing 100. This variation is shown in chart form in Figure 7, where curve 104 shows the relationship between the coercive force of the magnetizable portion of the record medium and the distance from the edge portion thereof, the distance of Figure 7 being scaled off in accord with the distance on Figure 6.

An alternative embodiment of the present invention is shown in Figure 8. In this figure, the lengthy magnetizable record medium 14 includes a backing 100 like that of Figure 6. However, the coating 102 is divided into two portions, 102b and 102c. The portion 102c is of material having a relatively high value of coercive force whereas the portion 102b has a lower value of coercive force. While the grading of coercive force thereby achieved is not in strict accordance with the variations in the magnetic field to which the various portions of the medium are exposed, the performance of the medium of Figure 8 is vastly improved over an equivalent medium with only a single coating.

In Figure 9, still another form of the present invention is shown. In this form, the medium 14 has a backing 100 and a coating portion 102. However, coating 102 is divided into three portions 102*d*, 102*e* and 102*f*. The portions 102*d* and 102*f* are of magnetizable material, the coercive force of the portion 102*d* being less than that of the portion 102*f*. The intermediate portion 102*e* is made of a magnetically inert material, such as, plastic.

In one method of forming a layer of magnetizable material having graded magnetic characteristics, a suspension of microscopic magnetic particles is formed in a suitable liquid vehicle which may be subsequently evaporated to deposit the particles. The magnetizable particles are of different sizes and, either by reason of the natural tendency of small particles to have high coercive force or by choosing magnetizable materials of progressively increased coercive force values for the smaller particles, are graded in coercive force in accord with size. The suspension is then permitted to remain on the medium while the latter is held in a substantially horizontal position to permit the particles to settle in accord with their relative sizes. Upon drying, the liquid vehicle, a coating having graded magnetic characteristics results.

The successive layers of magnetizable particles of the mediums of Figures 8 and 9 may be provided by first coating the backing 100 with a suspension of relatively low coercive force magnetic particles in a suitable liquid vehicle, permitting the vehicle to evaporate to form the first layer and then repeating the process with suspensions of particles of progressively increased coercive force. The vehicle is permitted to evaporate between successive coating and deposit the layers as required.

While I have shown particular embodiments of my invention, it will, of course, be understood that I do not wish to be limited thereto since many modifications may be made without departing from the spirit and scope thereof. I, of course, contemplate by the appended claims to cover any such modifications as fall within the true spirit and scope of my invention.

What I claim as new and desired to secure by Letters Patent of the United States is:

1. A lengthy magnetizable record medium for use in a magnetic recorder of the type in which a magnetically active surface of the medium is exposed to a magnetic field of graded intensity, said medium having a non-magnetic backing and magnetizable portions whose magnetic characteristics are graded in accordance with the distance of a selected portion from the magnetically active surface of said medium to compensate for the variations in intensity of said field, the portions of said record medium at said magnetically active surface having a higher coercive force than other portions of said medium disposed between said backing and said magnetically active surface, said other portions also having appreciable coercive force.

2. A lengthy magnetizable record medium for use in magnetic recorders of the type wherein a magnetically active surface of the medium is exposed to a magnetic field adjacent confronting pole pieces, said medium having a plurality of layers of different magnetizable materials, the layers being so arranged that the coercive force of the material of a selected layer with respect to the magnetically active surface varies inversely as the square of the distance of the selected layer from said magnetically active surface.

3. A lengthy magnetizable record medium for use in a magnetic recorder of the type wherein a magnetically active surface of the medium is exposed to a magnetic field of graded intensity, said medium having a pair of spaced layers of magnetizable material and a layer of magnetically inert material disposed between said pair of layers, both of said pair of layers having appreciable coercive force, the coercive force of the magnetic material of the layer nearest said magnetically active surface being greater than the coercive force of the magnetic material of the other of said pair of layers.

4. A lengthy magnetizable record medium for use in magnetic recorders and the like comprising a base portion of magnetically inert material, a layer of magnetizable material on said base portion, a layer of magnetically inert material coated on said layer of magnetizable material, and a second layer of magnetizable material having different magnetic characteristics from said first magnetic material coated on said layer of inert material.

HUGH A. HOWELL.

References Cited in the file of this patent

UNITED STATES PATENTS

| Number | Name | Date |
|---|---|---|
| 2,199,526 | McCowen | May 7, 1940 |
| 2,229,293 | Huntley | Jan. 21, 1941 |
| 2,443,756 | Williams | June 22, 1949 |
| 2,496,047 | Goddard | Jan. 31, 1950 |
| 2,501,126 | Howell | Mar. 21, 1950 |